US010733556B2

(12) United States Patent
Bencke et al.

(10) Patent No.: US 10,733,556 B2
(45) Date of Patent: Aug. 4, 2020

(54) AUTOMATED TASKING AND ACCURACY ASSESSMENT SYSTEMS AND METHODS FOR ASSIGNING AND ASSESSING INDIVIDUALS AND TASKS

(71) Applicant: Mighty AI, LLC, San Francisco, CA (US)

(72) Inventors: Matthew Justin Von Bencke, Bellevue, WA (US); Angela Beth Hugeback, Seattle, WA (US); Yuan Li, Bellevue, WA (US); Daryn Edward Nakhuda, Bainbridge Island, WA (US); Patrick Emmett O'Donnell, Seattle, WA (US); Matthew Newman Shobe, Mercer Island, WA (US)

(73) Assignee: Mighty AI LLC, San Francisco, CA (US)

( * ) Notice: Subject to any disclaimer, the term of this patent is extended or adjusted under 35 U.S.C. 154(b) by 949 days.

(21) Appl. No.: 15/219,035

(22) Filed: Jul. 25, 2016

(65) Prior Publication Data
US 2017/0323233 A1 Nov. 9, 2017

Related U.S. Application Data

(60) Provisional application No. 62/333,764, filed on May 9, 2016.

(51) Int. Cl.
G06Q 10/06 (2012.01)
G06N 7/00 (2006.01)
H04L 29/08 (2006.01)
G06N 20/00 (2019.01)

(52) U.S. Cl.
CPC ......... *G06Q 10/0633* (2013.01); *G06N 20/00* (2019.01); *H04L 67/306* (2013.01); *G06N 7/005* (2013.01)

(58) Field of Classification Search
None
See application file for complete search history.

(56) References Cited

U.S. PATENT DOCUMENTS

| 8,751,659 | B2 | 6/2014 | Greene |
| 2005/0004788 | A1 | 1/2005 | Lee et al. |
| 2006/0059151 | A1 | 3/2006 | Martinez et al. |
| 2009/0204470 | A1* | 8/2009 | Weyl ............... G06Q 10/06 705/7.13 |

(Continued)

OTHER PUBLICATIONS

United States Office Action, U.S. Appl. No. 15/588,478, dated Mar. 8, 2019, 12 pages.

(Continued)

Primary Examiner — Li Wu Chang
(74) Attorney, Agent, or Firm — Dority & Manning, P.A.

(57) ABSTRACT

Disclosed is a tasking system to assign individuals to tasks. The tasking system targets a user for the task based information in a user profile such as demographics, background and reputation of the user to perform a task. The tasking system predicts if a user will do a given task well based on a user's background, user's skill, and applied predictive algorithms. The tasking system manages the workflow of the task, assesses the probability of the user's answer being accurate, and continuously optimizes assignment and assessment of the task to improve data quality.

24 Claims, 11 Drawing Sheets

(56) References Cited

U.S. PATENT DOCUMENTS

| | | |
|---|---|---|
| 2010/0211435 A1 | 8/2010 | Duffy et al. |
| 2012/0005131 A1 | 1/2012 | Horvitz et al. |
| 2015/0242447 A1 | 8/2015 | Ipeirotis et al. |
| 2015/0317582 A1* | 11/2015 | Nath .................... G06Q 10/06 705/7.13 |
| 2017/0061341 A1 | 3/2017 | Haas et al. |

OTHER PUBLICATIONS

PCT Invitation to Pay Additional Fees and, Where Applicable, Protest Fee for PCT/US17/31719, Jul. 14, 2017, 2 Pages.
PCT International Search Report and Written Opinion for PCT/US17/31719, dated Sep. 7, 2017, 13 Pages.
McGrew, T., "Eight versions of Bayes's Theorem," 2005, 1 page.
United States Office Action, U.S. Appl. No. 15/588,478, dated Oct. 4, 2018, 14 pages.
Extended European Search Report for European Application 17796675.1, dated Sep. 16, 2019, 8 pages.

* cited by examiner

US 10,733,556 B2

AUTOMATED TASKING AND ACCURACY ASSESSMENT SYSTEMS AND METHODS FOR ASSIGNING AND ASSESSING INDIVIDUALS AND TASKS

CROSS REFERENCE TO RELATED APPLICATION

This application claims the benefit of U.S. Provisional Application No. 62/333,764, filed May 9, 2016, which is incorporated by reference in its entirety.

TECHNICAL FIELD

The disclosure generally relates to using crowdsourcing to solve large data problems, and more specifically, automation for assignment of individuals and tasks.

BACKGROUND

Crowdsourcing is one solution to solve a large data problem by breaking it into smaller tasks that can be completed by an individual. Once the smaller tasks are completed by individuals, the large data problem will be completed. A problem with using crowdsourcing to solve large data problems is that the smaller tasks may not be completed correctly, and thus, the large data problem will not be completed correctly.

It often is desirable to obtain and analyze a very large number of data points in order to have normalized or expected values of data. However, obtaining the large number of data points comes at a cost. For example, having receiving input quickly to achieve normalized or expected data may be impractical as the input from the crowd may not be received quick enough. Moreover, the input from the crowd may be imprecise and may cause deviations that consume even more time to move back towards normalization or expected values.

To increase speed of input from the crowd, in some instances the crowd may be compensated. However, the costs of this input can be cost prohibitive. For example, this requires a large compensation commitment to compensate the crowd for their input. However, even with the compensation, the results may still be unacceptable or outside of what are expected data points. Hence, in addition to being cost prohibitive, there is a waste of time and resources for data points that are unusable.

Moreover, there are issues with manually pairing individuals and tasks to be completed within short time frames. This process also may be time consuming, inefficient, and costly. If received data is not analyzed quickly to determine whether it is within a proper margin of expected results, the data ultimately may be unusable and require redoing the tasks.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
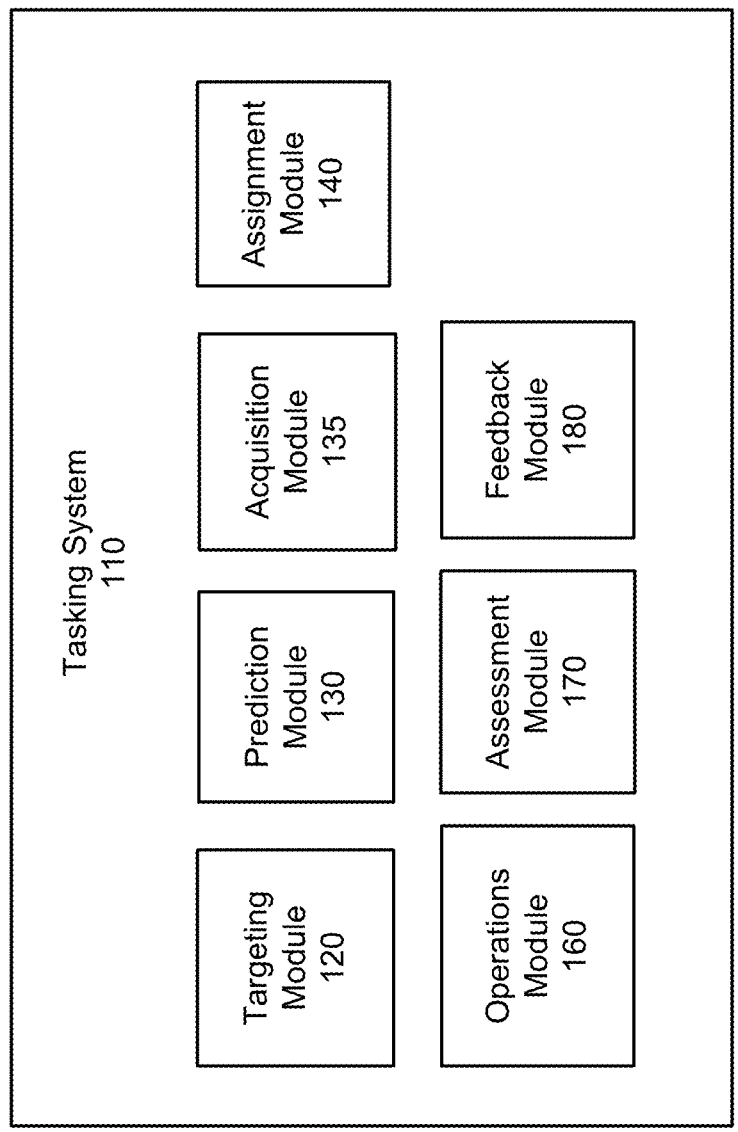
FIG. 1 illustrates a block diagram of an example tasking system.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Tasks may be discrete projects corresponding to processing for large data sets in computer systems. Large data sets often are unstructured and may be disorganized and/or inconsistent. Without laying some form of structure or organization to the data sets, the data sets may lack meaning and wither into a state of uselessness. Tasks provide a way of adding structure and/or organization to the data sets so that they may be useful in further processing and application. To provide accurate, consistent, and precise metadata, a technology needs to provide quality, often subjective, insights at scale, quickly and at an overall cost that justifies the effort. Prior technologies do not provide the necessary quality, speed, scale and cost, with an acceptable level of effort.

By way of example, a digitized image without additional data corresponding to that image may eventually fade into the ether if data corresponding to the image cannot be enhanced. For example, if the digital image is recognized to be a lake, as more digital images corresponding to a lake come online, the digital image of the lake may become lost in the internee's cacophony as thousands of other images of a lake come online. However, there may be unique aspects of the digital image of the lake that could be useful if that data can be augmented in a structured and/or organized manner so that it may be retrievable in a wide range of ways. For example, the image may include a sailboat, mountain background, unique flowers, a boat dock, sandy shoreline, green hued water, a picnicking family, and/or more. However, determining how best to add this additional data to the image and ensure its accuracy can be resource intensive and time consuming (e.g., in the case of dedicated workers) or can be haphazard (e.g., in the case of crowdsourcing data). The additional data may be a combination of objective fact, specialist insight, and subjective observations that can be augmented with the image data. For example, the objective fact may be "there is a sailboat [in an image]", the specialist insight may be "the sailboat [in the image] is a sloop", and the subjective observations may be "the family [on the sloop in the image] is happy, celebrating and represents togetherness". The proliferation of unstructured content on the web multiplies these myriad labeling challenges by the billions, as businesses need additional, accurate, precise, consistent and often subjective metadata to describe images, videos, audio, social networking posts, and other content so that they are discoverable, actionable and more likely to engage users/customers successfully. Furthermore, a corpus of well-structured data is paramount to building machine learning systems, which can then be used in tandem with human annotation to automate these processes at a cost and scale that would be unachievable with humans alone.

Disclosed by way of example embodiments is a tasking configuration. The tasking configuration may include a system, method and/or a computer program product (e.g., a computer readable storage medium that stores instructions executable by one or more processing units). The tasking configuration is structured to assign, analyze, and confirm completion of tasks in computer systems. In one example embodiment, the tasking configuration may include a targeting module, a prediction module, an assignment module, an operations module, an assessment module, and a feedback module for determining computerized tasks for assignment to a user of a plurality of users. By way of example, the targeting module may target a specific user to perform a task based on targeting criteria and stored information from a user profile. The prediction module may predict success of the user to perform the task based on at least one of a past performance of the user on a similar task previous assessment and customer feedback on completed tasks. The assignment module may assign the task to the user if the predicted success is greater than a threshold level. The operations module may manage a workflow for the task assigned to the user. The assessment module may assess if the task as completed by the user is within a predefined acceptance range. The feedback module may receive customer feedback on the task when completed by the user.

As described herein, and by way of example, a task may include inserting or updating metadata for text content (e.g., content from social media and websites; text that is structured, unstructured, and semi-structured), media files, or portions of media files, such as images, which may include audio or video (series of still images in succession). Other examples of tasks include classifying content; extracting questions and matching them to answers; ranking content based on a given set of criteria; taking a survey based on media and/or text; conducting web research to augment metadata; authoring verbose descriptions, including titles and captions; taking logic-based surveys based on a set of content; correcting, editing and/or reviewing any of the aforementioned.

The tasks are specifically assigned to targeted users (e.g., individuals or fungible groups of individuals). The user is particularly targeted based on a system analysis determining that such user is best suited to accurately complete the task. Moreover, as the task is being done the system also monitors progress and evaluates whether the received information corresponding to the task compares with possible expected results. Where a task may require a course correction, the system directs the user completing the task in the direction of the expected results. The system also has flexibility to receive input from the user countering the direction to account for new data that the system may not have considered to thereafter further refine the expected results data.

Example Tasking System

Figure (FIG. 1 illustrates a block diagram of an example tasking system 110 for determining computerized tasks for assignment to a user of a plurality of users. Users of the tasking system 110 may include mentors or mentor users. Mentor users may be users of an elevated status. Mentor users may be given access to special types of tasks that a more typical user may not have access to. Mentor users may be selected based on having a history of providing high quality work and/or helpful feedback as assessed by other users and/or internal administrators.

As shown in FIG. 1, the block diagram of the tasking system 110 may include, but is not limited to, a targeting module 120, a prediction module 130, an acquisition module 135, an assignment module 140, an operations module 160, an assessment module 170, and a feedback module 180. Each module may be embodied as software and/or hardware. The software may comprise instructions executable by a machine, e.g., a computer system with a processor, e.g., as illustrated and described with FIG. 10. The hardware may be, for example, processor (or controller), a field programmable gate array (FPGA) and/or application specific integrated circuit (ASIC), and may further comprise firmware operating with such processor, FPGA and/or ASIC. The modules 120-180 may be in communication with one another using suitable communication technologies, e.g., software calls and/or hardware signaling. It will be recognized that although modules 120-180 are shown to be separate in FIG. 1, any of the modules 120-180 may be combined into fewer modules, such as into a single module, or divided into more modules as may serve a particular embodiment.

The targeting module 120 is configured to determine if a user meets targeting criteria for a task. The prediction module 130 is configured to predict a probability of success for the user to a task. The assignment module 140 is configured to assign a user to a task. The operations module 160 is configured to determine how users complete tasks and to manage custom task workflow and control quality velocity and cost dials. The assessment module 170 is configured to assign confidence scores to answers. The customer feedback module 180 is configured to interface to the customer, both in real-time and in follow-up. The modules 120-180 will be described in more detail in the sections titled "Targeting", "Prediction", "Assignment", "Operations", "Assessment", "Customer Feedback", and "Continuous Learning" following the detailed description of FIG. 2.

Looking in more detail, the targeting module 120 may be configured to target a user based on stored information in their user profile to perform a task. In one embodiment, the targeting module 120 may be further configured to receive a login from a user through an external system. The targeting module 120 stores information such as demographics and background information from the external system in the user profile. The targeting module 120 also may be further configured to store information on a reputation of the user based on previous performance and activities of the user in the user profile. The stored information in the user profile may include previous performance and activities of the user for a given domain or task type. A domain may be an area of specialized knowledge (e.g., demonstrated understanding of radiology, interior design, fly fishing, and popular contemporary fashions). The targeting module 120 targets a user for a task based on the stored demographic information, background information, and previous performance and activities information of the user in the user profile.

The prediction module 130 may be configured to predict success of the user to perform the task based on at least one of a previous assessment and customer feedback on completed tasks. In one embodiment, the prediction module 130 may be further configured to predict success of the user to perform the task based on at least one of the following: past performance of the user on similar tasks, patterns in previous tasking behavior of the user, user data from outside sources, and user surveys.

The acquisition module 135 is configured to obtain additional users that are predicted to complete a given set of tasks with high accuracy. The acquisition module 135 identifies traits of pre-existing users who complete a given set of tasks (defined by task type and/or area of specialized human knowledge) accurately, and uses those traits to define a digital advertising campaign. These campaigns then run on digital properties (e.g., FACEBOOK, LINKEDIN, specific professional forums) to acquire similar users based on traits such as demographics, professional backgrounds, hobbies, certifications, social graphs, and "likes." The acquisition module 135 adjusts its targeting criteria, spend, and acquisition velocity based on the system's assessment of users acquired thusly. In one example embodiment, the acquisition module 135 identifies common characteristics of users based on previous performance of the users on a given set of tasks being equal to or above an acquisition threshold value. Once the common characteristics are identified, the acquisition module 135 may acquire additional users with the common characteristics, and adjusts the common characteristics. The acquisition module 135 may adjust the acquisition threshold value, spend, and acquisition velocity of additional users based on assessment of additional tasks as completed by one or more of the additional users. The acquisition threshold value may be a number or a percentage. For example, a given set of five tasks may have an acquisition threshold value of the number 4 (users must satisfactorily complete 4 tasks out of 5) or may have an acquisition threshold value of 80%.

The assignment module 140 may be configured to assign the task to the user if the predicted success is greater than a threshold level. In one embodiment, the assignment module 140 may be further configured to train the user for a task set, qualifies the user to perform the task set, and gives the user access to the task set after the user successfully completes the training and qualifying steps for the task set. The assignment module 140 also adjusts the assignment criteria based on the number of qualified users identified through the training and qualifying steps. The assignment module also adjusts the maximum number of tasks a user can complete.

The operations module 160 may be configured to manage a workflow for the task assigned to the user. In one example embodiment, the operations module 160 may be configured to provide questions to the user for monitoring and feedback for tasks and to determine payment for tasks. The operations module 160 may provide a customer satisfaction phase of the task which allows users with elevated status (e.g., mentors) and customers to iterate on the task process until the customer is satisfied with work produced by the mentor. The operations module 160 may be configured to create communities of users to allow a group of users create, manage, and communicate within a community. The operations module 160 also may be configured to manage a workflow for the task assigned to the user. The operations module 160 may vary the assignment of the task, the qualification of a user to be assigned to a task, or assessment of the quality criteria of a task at each step of the workflow.

The assessment module 170 may be configured to assess if the task as completed by the user is within a predefined acceptance range. In one embodiment, the assessment module 170 assesses if tasks, tutorials, trainings, or qualifications are completed by the user within a predefined acceptance range. The assessment module 170 uses different techniques including user agreement, holistic scoring, standard questions, trap questions, and user behavior. For user agreement, the acceptance range is based on the answers from a large number of users or the answers weighted by user reputation for a smaller number of users. For holistic scoring, the acceptance range is based on feedback of a user with elevated status (mentor) of the completed task as being satisfactory or unsatisfactory. For standard questions, the acceptance range is based on having an answer agree with a predetermined correct answer. For trap questions, the acceptance range is based on having an answer that does not match a predetermined incorrect answer. For user behavior, the acceptance range is based on whether user behavior falls within a range of user behaviors of a large number of users or weighted by user reputation for a smaller number of users.

The feedback module 180 may be configured to receive customer feedback on the task when completed by the user. In one embodiment, the customer receives data insight from the system. The received data insight may be customized by the customer to include both raw data and weighted best answers and confidence scores. The customer may agree or disagree with the data insight, and provide this feedback to the system. The feedback from the customer may influence user reputation and other calibration points for future tasks. Other feedback may be automated and provided real-time as users complete tasks, including that based on telemetry relative to norms (including pace and input patterns), answers for tasks with known "correct" inputs, and/or responses to trap questions. The tasking system uses the customer feedback and data from other modules for optimization in determining computerized tasks for assignment to a user of a plurality of users.

Figure 2:
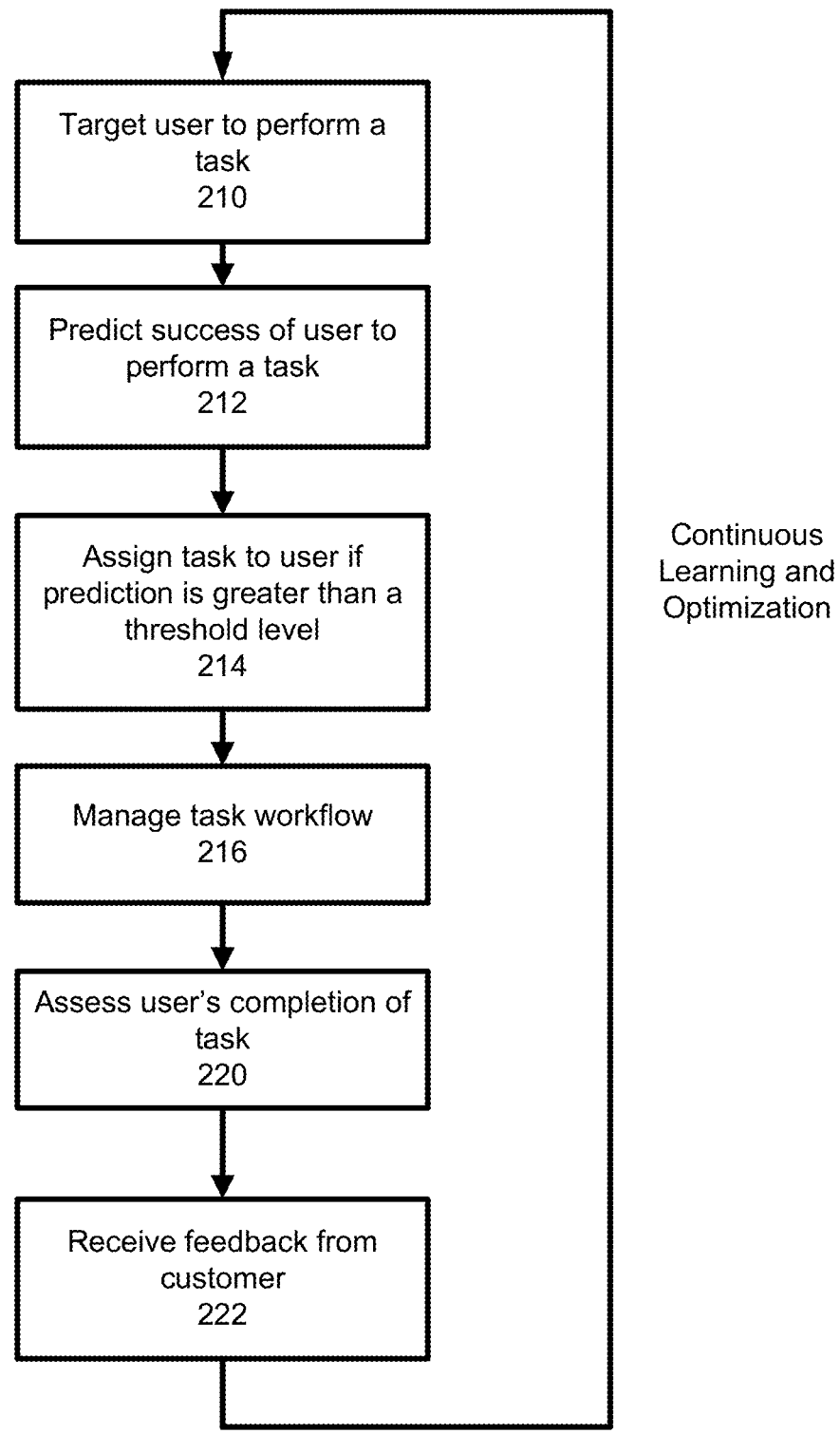
FIG. 2 is a flow chart diagram for the example tasking system.

FIG. 2 is a flow chart diagram 200 for the example tasking system 110. FIG. 2 illustrates an example process for determining computerized tasks for assignment to a user of a plurality of users. The targeting module 120 targets 210 a user to perform a task based on targeting criteria. The prediction module 130 predicts 212 success of a targeted user to perform a task. The assignment module 110 assigns 214 a task to a targeted user if the prediction of success is greater than a threshold level. The operations module 160 manages 216 the task workflow. The assessment module 170 assesses 220 the user's completion of a task. The feedback module 180 receives 222 feedback from the customer. The tasking system 110 uses the customer feedback and data obtained from the previous stages of the flow chart diagram 200 for optimization in determining computerized tasks for assignment to a user of a plurality of users.

Targeting

A customer provides the tasking system 110 with a task set. A customer may be any entity that is seeking to have a particular task set (one or more tasks) completed. A task set may include a set of tasks for a user or set of users to complete. For example, the task set may be to apply metadata tags to a group of images. The tasking system 110 determines the correct audience, or group of users, to perform a task. The tasking system 110 may receive targeting criteria from the customer for a task set, or the tasking system 110 may base the targeting criteria on characteristics of a target audience for the customer. For example, targeting criteria may include characteristics such as gender, age range, relationship status, level of education, field of study, job title, and/or employer.

The tasking system 110 includes a targeting module 120 that is configured to target a user for a task. The targeting module 120 targets a user for a task based on the targeting criteria matching information from a user profile. The user profile of the user contains information about the user from the tasking system 110 or from external systems. The tasking system 110 is configured to allow users to link their user account on the tasking system to their user accounts on one or many external systems (e.g., an OAUTH based system from FACEBOOK, LINKEDIN, TWITTER, GOOGLE, PAYPAL, MICROSOFT, etc.) so that they may easily login to the tasking system 110 without an additional username and password. The targeting module 120 may aggregate profile information about the user from the external system and store this information in the user profile of the tasking system 110.

Figure 3:
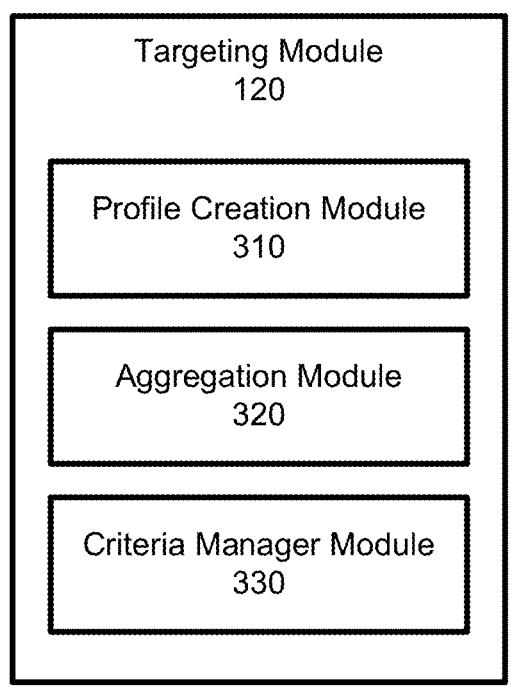
FIG. 3 is a block diagram illustrating example components of the targeting module.

FIG. 3 is a block diagram illustrating example components of the targeting module 120. As shown, the targeting module 120 may include, but is not limited to, a profile creation module 310, an aggregation module 320, and a criteria manger module 330, each of which may be in communication with one another using any suitable communication technologies. Each module may be embodied as software and/or hardware. The software may comprise instructions executable by a machine, e.g., a computer system with a processor, e.g., as illustrated and described with FIG. 10. The hardware may be, for example, processor (or controller), a field programmable gate array (FPGA) and/or application specific integrated circuit (ASIC), and may further comprise firmware operating with such processor, FPGA and/or ASIC. The modules 310-330 may be in communication with one another using suitable communication technologies, e.g., software calls and/or hardware signaling. It will be recognized that although modules 310-330 are shown to be separate in FIG. 3, any of the modules may be combined into fewer modules, such as into a single module, or divided into more modules as may serve a particular embodiment.

The profile creation module 310 may be configured to create user profiles for users of the tasking system 110. The user profile may be created the first time a user logs into the tasking system 110. The profile creation module 310 creates a user profile for the user based on information about the user. The user profile may include information about the user such as: demographics, background (e.g., skills, education, certifications, job history, hobbies and "likes" of a user), and proven reputation (e.g., previous performance of the user in the tasking system).

The aggregation module 320 may be configured to aggregate information about the user from one or more sources to the user profile in the tasking system 110. The one or more sources may be the tasking system 110 or an external system (e.g., FACEBOOK, LINKEDIN, PAYPAL, etc.). The tasking system 110 may allow users link a user account of an external system to a user account of the tasking system 110. The user may log in a user account on an external system to log in the user's account on the tasking system 110. The tasking system 110 may have access to information from the external user profile and may aggregate information from the external user profile with the user profile on the tasking system 110. Each external system may provide different information about the user. For example, FACEBOOK may provide information about interests, relationships, and education history while LINKEDIN may provide employment history, certifications, and skills.

The criteria manager module 330 may be configured to manage the targeting criteria used to select users for tasks. The initial targeting criteria may be received from the customer or the criteria manager module 330 may determine initial targeting criteria based on a customer's target audience (e.g., eating habits or pet ownership). The criteria manager module 330 may continuously adjust the targeting criteria during a task workflow.

Figure 4:
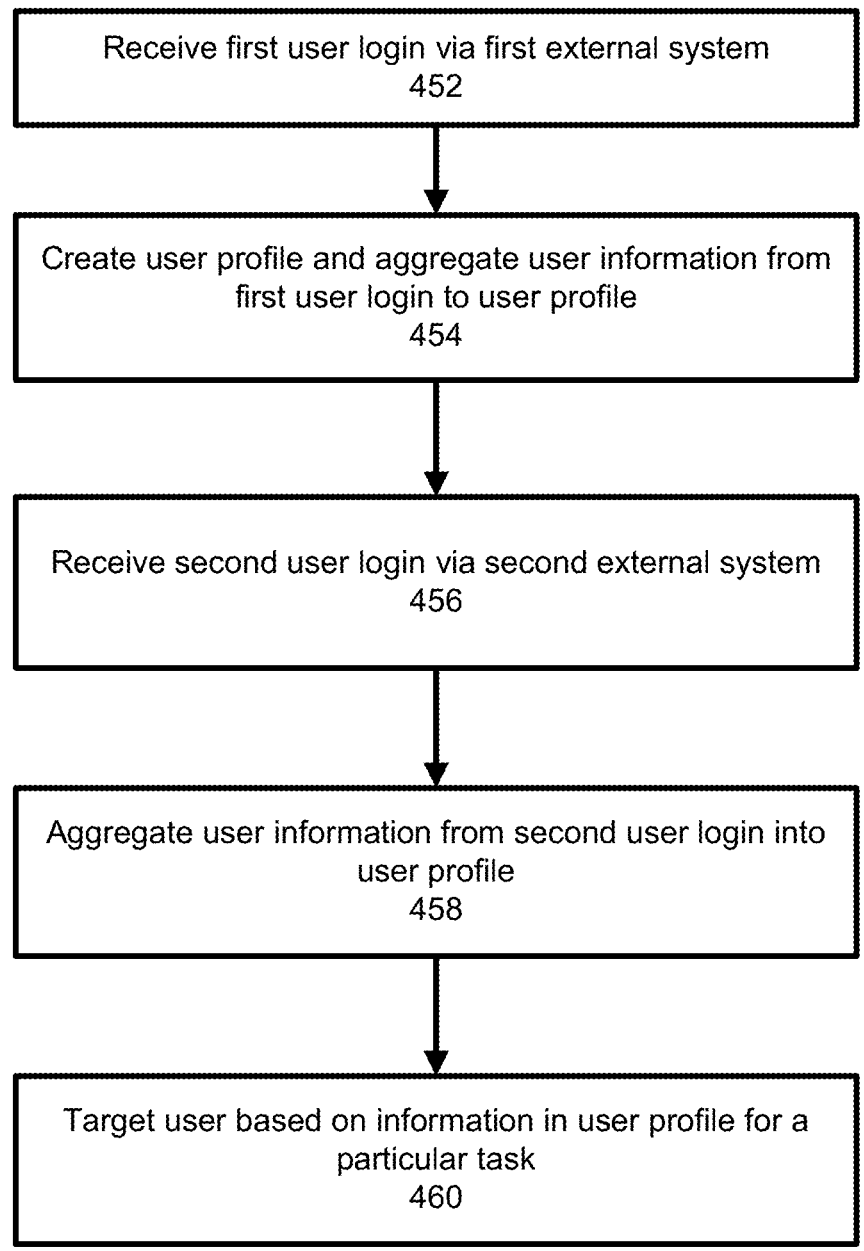
FIG. 4 is a flow chart diagram for an example targeting module.

FIG. 4 is a flow chart diagram 400 for an example targeting module 120. In this example, the user has linked an external account to an account for the user in the tasking system 110. The targeting module 120 receives 452 a first user login via a first external system (e.g. LINKEDIN, TWITTER, FACEBOOK, etc.). The targeting module 120 creates 454 a user profile and aggregates user information (e.g., skills, education, certifications, and job history) from the first user login to the user profile. The targeting module 120 receives 456 a second user login (e.g., FACEBOOK) via a second external system. The targeting module 120 aggregates 458 user information from the second user login (e.g., hobbies and "likes" from that second account) into the user profile. The targeting module 120 may be configured to target (or specifically identify or determine) 460 a user based on information stored in the user profile for a particular task.

Prediction

In addition to targeting users for tasks based on profile information matching targeting criteria, the tasking system 110 also may estimate the probability that the user will complete a task satisfactorily. The tasking system 110 includes a prediction module 130 that is configured to predict which users will likely perform well for a given task. The prediction module 130 estimates the probability that the user will perform the task satisfactorily based on information about the user such as the user's past performance on similar tasks, the user's patterns in tasking behavior, internal surveys, and information from external systems. Examples of user's past performance may include the amount of time spent for each task or the percentage of correct answers on similar tasks.

The prediction module 130 may include a model to estimate how likely that user is to perform the task at the desired level of quality. These models can be specific to each task. Input features in the model can include all available user features such as demographics, skills, interests and past performance on other tasks. An automated model construction process can then be used to select a model which is able to predict overall user accuracy (e.g., user reputation) and this model can be used to score the accuracy of any user prior to allowing them to answer any questions in that task set or family of tasks by providing the appropriate inputs in to the model and receiving the prediction (or score) as output. Additional details on this model are found below in the detailed description. It is noted that a benefit of the configuration of the prediction module 130 may include, for example, identifying the fewest numbers of users to complete a task quickly and efficiently, thereby saving resources while maintaining high accuracy. Moreover, a data driven analysis as described also may eliminate flaws typically present from manual processes, e.g., hidden prejudices and judgments that are driven by instinct rather than data driven analysis.

Assignment

Once users are identified for a task set by targeting and predicting the success of the user, the tasking system 110 places them in an optional workflow comprising training task sets, qualification task sets, and ongoing tutorial task sets. The tasking system 110 includes an assignment module 140 configured to assign a user to a task. Once a user is identified for a task by the targeting module 120, and the prediction module 130 determines the predicted success of the user for the task, the assignment module 140 may assign a task to a user based on the predicted success of the user being greater than a threshold level.

The assignment module may be configured to undertake machine learning. In one example embodiment, the assignment module 140 may additionally train, qualify and allow users to access to the task after they have been trained and qualified. The assignment module 140 may train a user by introducing the user to core concepts for a task set (e.g., specific instructions) and functional skills (e.g., how to use aspects of the user interface of the tasking system 110). The assignment module 140 also may qualify a user for a task using a set of questions to test skills and knowledge of the user for a task. The assignment module 140 may give users access to a task after the user successfully completes the training and qualification for a task. The assignment module 140 is further described with FIGS. 5 and 6.

Figure 5:
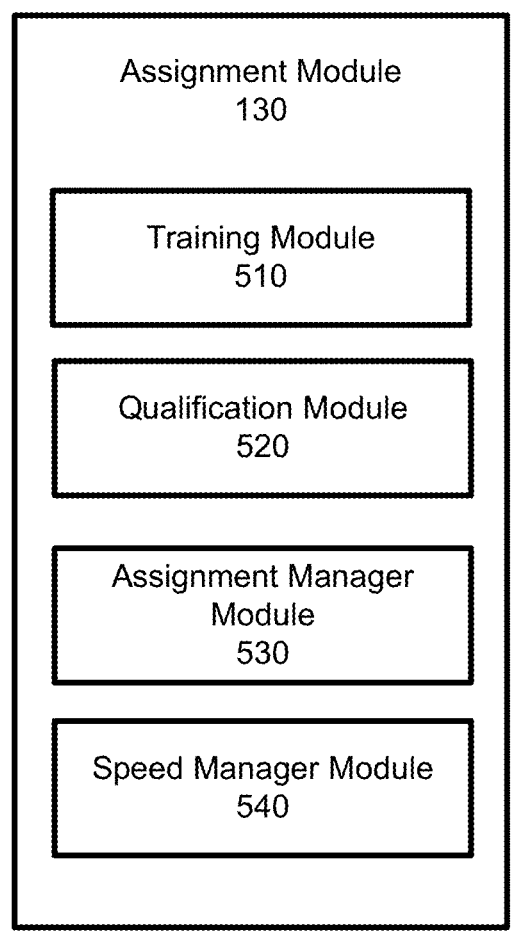
FIG. 5 is a block diagram illustrating components of an example assignment module.

FIG. 5 is a block diagram illustrating components of an example assignment module 130. As shown, the assignment module 130 may include, but is not limited to, a training module 510, a qualification module 520, an assignment manger module 530, and a speed manager module 540. Each module may be embodied as software and/or hardware. The software may comprise instructions executable by a machine, e.g., a computer system with a processor, e.g., as illustrated and described with FIG. 10. The hardware may be, for example, processor (or controller), a field programmable gate array (FPGA) and/or application specific integrated circuit (ASIC), and may further comprise firmware operating with such processor, FPGA and/or ASIC. The modules 310-330 may be in communication with one another using suitable communication technologies, e.g., software calls and/or hardware signaling. It will be recognized that although modules 510-540 are shown to be separate in FIG. 3, any of the modules may be combined into fewer modules, such as into a single module, or divided into more modules as may serve a particular embodiment. Additional description of modules 510-540 will follow the detailed description of FIG. 6.

Figure 6:
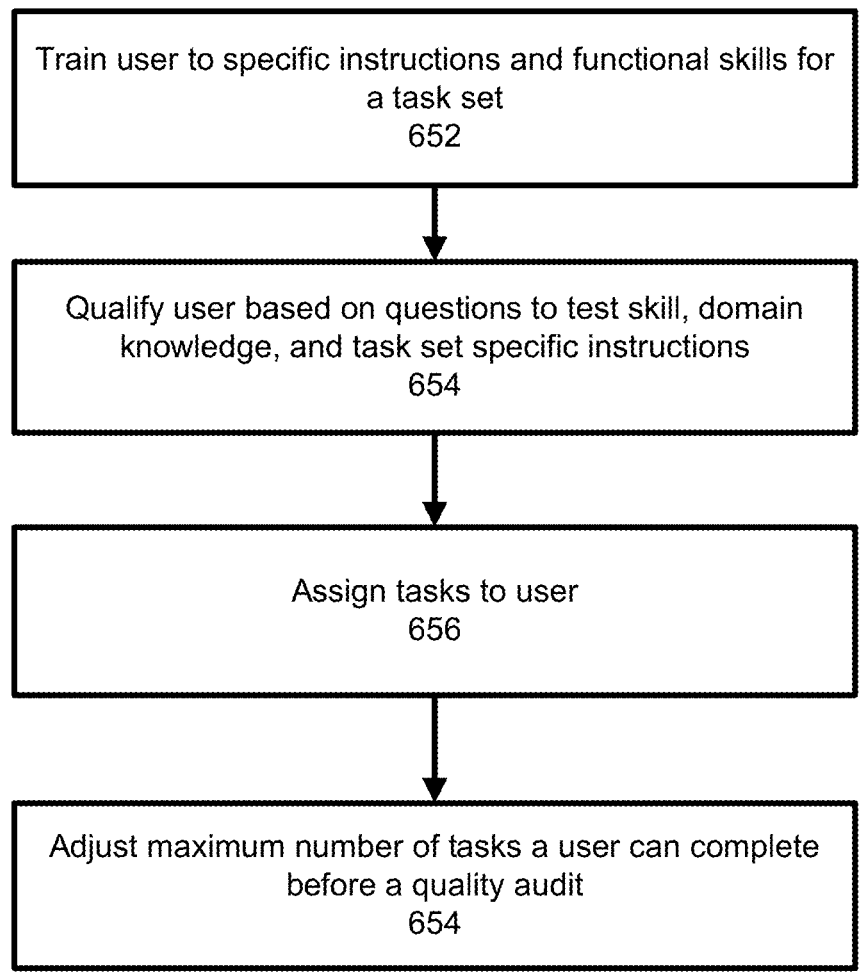
FIG. 6 is a flow chart diagram for processing by an example assignment module.

FIG. 6 is a flow chart diagram 600 for processing by an example assignment module 130. The training module 510 is configured to interact with a user through a user account for that user. The training module 510 may be configured to train 652 the user to perform specific instructions and functional skills for a pre-defined task set. The qualification module 520 may be configured to qualify 654 a user based on questions to test skill, domain knowledge, and task set specific instructions. The assignment manager module 530 may be configured to assign 656 tasks to users. The speed manager module 540 may be configured to adjust 654 a maximum number of tasks a user can complete before a quality audit is executed to analyze received results from the qualifications module 520, the assignment manager module 530, and the speed manager module 540.

The training module 510 may be configured to introduce users to core concepts for a task set (e.g., specific instructions). The training module 510 also may be configured to introduce user to functional skills (e.g., how to use various aspects of the user interface). In one example embodiment, the training module 510 may provide an interactive tutorial for more complex tasks. This may help the system determine whether users understand the instructions provided to them by the system. The assignment module 130 may be configured to allow users to access the tutorial task sets throughout the lifecycle of the task. The user may return to the tutorial task set and repeat the tutorial at any time if a refresher is needed. For example, the training module 510 may train a user to create bounding boxes around specific items in an image. The bounding boxes may be used to identify objects in an image. The object may be any object, for example, a living organism, an inanimate object, a characteristic of an object, a portion thereof, etc. The user may complete the training task by drawing a box around a specific item (e.g., a hat, eyeglasses, or particular clothing item) in an image, and the training module 510 may provide specific instructions such as to make sure the sides of the box touch the item when drawn. The training module 510 may provide the user with visual real-time feedback about a wrong answer by showing the user a correct example of placement of a bounding box relative to the user's placement of the bounding box on the image. The training module 510 may train the user to identify with keywords the specific item and give examples of keywords that may be correct (e.g., beanie, skull cap, skullcap, eyeglasses, glasses, bifocals).

The qualification module 520 may be configured to test the user using a set of questions that test both the skills needed for a specific task as well as domain and task set specific instructions. The evaluation of the answers may be performed using techniques such as comparison to known answers, consensus with the community, human review, and related heuristics (e.g., rules constructed by mathematical models that consider inputs such as keyword search in phone interviews and telemetry). Telemetry is user interaction behavior collected automatically, such as how quickly a user completes a task, the order in which the user issues commands, and any patterns among the answers of a user—for example, "does the user scroll down to see all possible answers in a multiple choice"; "does the user always select the top option". The assessment may be performed by the tasking system 110, other users in the community, or by the customer themselves and is further described in the section of the detailed description titled "Assessment", describing the assessment module 170. Techniques such as consensus with the community, human review and performance relative to known acceptable answers for given questions may be useful when there may be no one right answer, but there are answers that are either determined to be subjectively good or subjectively bad.

The tasking system 110 may be configured to ask a question to a large number of users and receive possible answers to the question from a number of users. The tasking system 110 may process the possible answers into a data graph corresponding to possible answers and determine if a right or wrong answer exists based on the proximity or remoteness of possible answers on the data graph. The tasking system 110 also may be configured to return the determined right answer or determined wrong answers.

The qualification module 520 algorithmically and in real-time evaluates the probability of a given answer being accurate based upon a variably weighted heuristic that combines these techniques. After satisfactorily completing the training task set and qualification test, the assignment module 130 will give a user access to a task. If a user does not pass the qualification test, the assignment module 130 may give the user additional chances to retake the test at a later date.

The assignment manager module 530 may be configured to adjust the assignment criteria to vary the quality and velocity of tasks at scale. For example, the assignment module 130 may want high quality completion of tasks. The assignment manager 530 also may set the criteria for qualified users to be based on users who score at a predefined level or threshold, e.g., the $95^{th}$ percentile on their qualification test and who continue to perform at the desired level of quality as determined by a combination of methods described in the section labeled "Continuous Learning". In another example, the assignment module 130 may want to accelerate large batch completion of tasks, and the assignment manager 530 may adjust the criteria to users who score at another predetermined level or threshold, e.g., the $80^{th}$ percentile, on their qualification to increase the number of qualified users completing tasks.

The speed manager module 540 may be configured to adjust the maximum number of tasks an individual can complete before a quality audit, based on knowledge of the task batch, users, quality requirements and algorithmic indicators of the above. The speed manager 540 may be configured to allow the tasking system 110 a pause (or temporary suspension) to calculate a standard across a large number of users with a common baseline of data, and, if necessary, to verify that quality through human review. The speed manager 540 may apply "speed brakes" (or predefined delays), (e.g., each user is paused after completing N tasks), or, after a task set is optimized, algorithmically and in real-time based on a number of criteria, including a given user's speed, reputation, accuracy, consensus, and the number of tasks completed since the last human review (community and/or employee).

In one example embodiment, the tasking system 110 may include a Community Quality Assurance (QA) system. The Community QA system allows for a user's work to continue uninterrupted as quality audits occur within the system in real time. However, if there are not enough review tasks being pulled from the review queue by mentor users, the user will fall too far behind in their QA assessments. The speed manager module 540 may pause the user until the needed reviews have been completed. The concept of a mentor will be described in more detail in FIG. 7.

Figure 7:
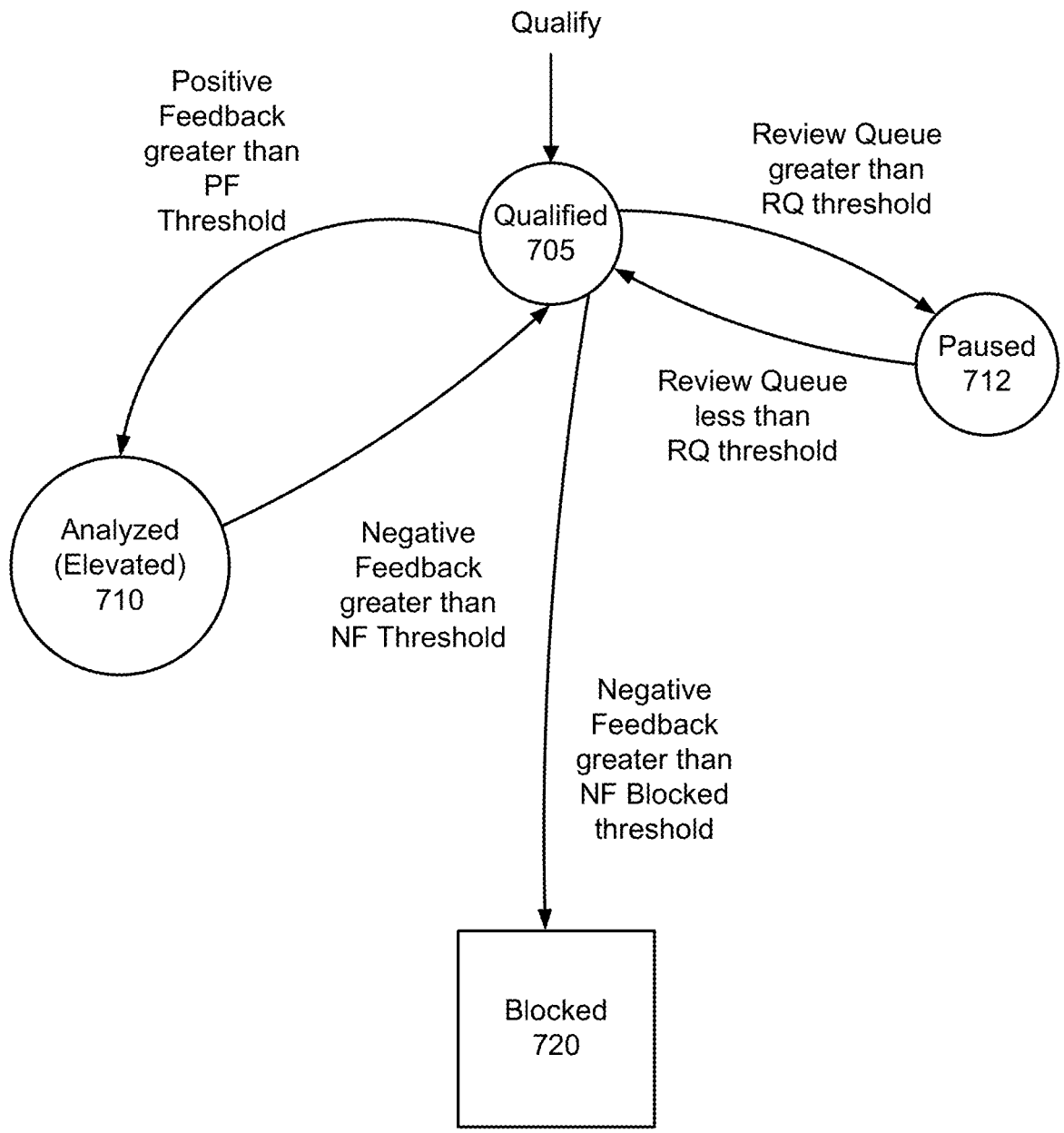
FIG. 7 is a state diagram for an example user interaction.

FIG. 7 is a state diagram for an example user interaction. As shown, the state of a user interaction as captured by the system for the corresponding user account may include, but is not limited to, a qualified state 705, an elevated state 710, a blocked state 720, and a paused state 712. In one example, the tasking system 110 may be configured to output training information to capture user responses to that information. The tasking system 110 may analyze (e.g., evaluate) the responses to qualify that user for a task. When the system determines, based on the analysis of the responses, that the user is qualified, the account associated with the user is set (e.g., toggled) to a qualified state 705 from what may previously been an unset (e.g., not yet qualified) state.

With the user now qualified, tasks may be assigned to the user via the user account. The assigned tasks correspond to tasks that the system determines a user could successfully complete based on the qualification. As the qualified user completes tasks, the system may be configured to analyze the task and include positive feedback (PF) on the tasks. The positive feedback corresponds to data that is set with the user account that includes information on how well the task was completed, for example, tracking the specific task, the inputs received for the task, acceptance of the inputs, and the time to complete the tasks.

A qualified user also may receive negative feedback (NF). For example, the system may receive information that the completed task is inaccurate, portends to responses not within the graph of acceptable response, and/or is not completed in a timely manner. Accordingly, the system may assign receive negative feedback (NF) on the completed tasks within the user account. For example, the system may store information associated with the user account that may include task completed, responses received, rejection of responses, and/or time for completion. When the user accounts accumulates a NF value (e.g., score) greater than a NF threshold, the qualified user may be demoted to a blocked state 720. A qualified user may be placed in a paused state 712 if the review queue for the qualified user is greater than that of a review queue (RQ) threshold. A paused user may return to a qualified state 705 if the review queue is less than a RQ threshold.

When the qualified user account reflects a PF value (e.g. score) greater than a PF threshold, the qualified user may be recommended as a mentor. The system is configured to evaluate the recommendation and can promote the qualified user to an elevated state 710 by setting (e.g., toggling) a mentor value in the user account.

Over time, as a mentor completes tasks, those tasks are analyzed through the system. Some artificial intelligence may be used to analyze the tasks, and human mentor may be injected at some point if necessary. For example, the system may receive information that the completed task is accurate or inaccurate, does or does not portend to responses within a graph of acceptable response, and/or is or is not completed in a timely manner. Analyzed mentor task may further include monitoring and analyzing guidance responses to qualified users, accuracy of the guidance and timeliness of the guidance. Accordingly, the system may assign positive feedback (PF) or negative feedback (NF) on the completed tasks within the user account for the mentor. When the user account accumulates a NF value (e.g., score) greater than a NF threshold, the mentor is demoted back to a qualified state 705 by setting the mentor value back to a non-qualified state and setting the qualified state value back to a qualified state.

In one example embodiment, the tasking system 110 may stochastically select the task to be moved to the review queue for inspection by mentor users. If the tasking system 110 determines that too many of the user's answers are waiting in the review queue then the speed manager module 540 places the user in the paused state which prevents the user from completing more tasks until enough of their reviews are completed. When enough of their reviews are completed, the speed manager module 540 moves the user back to the tasking state.

As previously noted, if the user consistently provides high-quality answers the user is promoted to be a mentor. If the user continues to provide very high-quality work and their mentor assessments are found to be accurate as well then they will remain in the mentor state, but if at any time their overall quality for tasking or review declines then that user loses their mentor status for the task. If a user consistently provides low-quality answers they will be placed in the blocked state and a portion of their answers may be ignored (re-opened to be answered by other users) and if there is clear evidence of fraud they may not be paid for that work.

In another embodiment, when a user qualifies for a task set, the user is given access to a predetermined quantity of tasks in a task set. When a user approaches a threshold limit the speed manager module 540 flags the user for manual quality review. If the user exceeds a threshold limit before the appropriate amount of review has been conducted, the speed manager module 540 places the user in a paused state while their answers are reviewed. If the user receives a positive review and/or if the user's quality score remains above the desired quality threshold then the speed manager module 540 grants the user access to an additional number of tasks. If the user receives a negative review and/or if their quality score falls below the desired threshold then they may not receive additional tasks, the tasking system 110 may ignore all of some of their previous answers and submit them for re-authoring, and the user may or may not be paid for their previous work based on the nature of the assessment. A user may be placed in the blocked state at any time during the tasking process if their automated quality score falls below the desired threshold.

Users that are analyzed to have received too many negative assessments overall or too many negative assessments in recent history may be blocked by the tasking system 110. Assessment results also are incorporated in to user quality scores. Users may be blocked on several optional criteria: mentor users who have reviewed their answers as obvious intentional fraud; user scores fall below the desired quality threshold; user scores are low compared to the other users completing the task and the overall quality on the entire batch of tasks (over all users) is found to be falling below the desired quality threshold. Once a user has been blocked they may not receive additional tasks of this type (or optionally similar tasks), and may or may not be paid for their previous tasks based on the nature of the assessment. Users who receive consistently positive assessments and whose quality scores are high become eligible to be promoted to mentor user status.

Operations

After users are given access to a task, the tasking system 110 manages aspects relating to the completion of the task. The tasking system 110 includes an operations module 160 that may be configured to manage task workflow or completion of a task.

The operations module 160 may specify a quality threshold and ensure that the ultimate quality of any user's accepted output meets that threshold by dynamically allocating successive applications of quality assurance processes. Example quality assurance processes could include automated tests (e.g., check whether the answer includes words that are not allowed in submissions), review by a mentor user or review by a non-mentor user.

In one example implementation when a user's accuracy on all submitted work does not meet the desired quality threshold, the system would determine how many instances of a general review by users who have qualified to do general review on a given task that answer would need to pass before the probability that the answer is actually correct finally meets the threshold. For example, the number of instances could be computed by selecting the minimum number of users who must view and accept the answer as being correct before the probability that the answer is correct given that it passed all reviews would exceed the threshold.

The probability that an answer is correct given that it has passed some quality assurance process is equal to P(Correct|Passed)=P(Passed and Correct)/(P(Passed and Correct)+P(Passed and Incorrect)) which is the probability that an answer has passed the process and was correct divided by the sum of the probability that an answer has passed the process and was correct and the probability that an answer has passed the process and was incorrect.

It is possible to anticipate and manage tradeoffs between velocity, quality and cost by partitioning the user population according to some criteria (e.g., the quality of work that users produce on a specific task) and dynamically adjusting the inclusion or exclusion of specific partitions from participation in the task. The operations module 160 may be configured to restrict the participation of members from each partition to review and interact only with work from members of the same partition. This optional restriction ensures that including or excluding a given partition from participating in a task does not affect the cost, quality or velocity of any other partition.

The operations module 160 may be configured to stochastically provide questions to the user for monitoring and feedback for tasks. Throughout the tasking process, users may encounter different types of tasks that are used to monitor and rate their performance, without explicit notice on these different tasks. Users may encounter standard questions where their answer will be compared to a known correct answer and trap questions where their answer will be compared to a known incorrect answer. Thus, the operations module 160 is configured to provide users with real-time, in-task feedback. The ability to give real-time feedback increases the likelihood that users will provide high-quality answers.

In one example embodiment, the operations module 160 may stochastically delivers standard questions with known correct answers to evaluate a user's alignment with the expected responses. The standard questions are used to prevent fraud and to confirm the status of a user (e.g., whether a user remains qualified).

In one example embodiment, the operations module 160 stochastically delivers trap questions with known incorrect answers to identify when users miss important details. Trap questions are helpful to verify mentor users consistently identify incorrect answers as they conduct reviews. Mentors stochastically receive review tasks (e.g., trap questions) which appear to be typical user reviews but are actually known incorrect answers. This ensures that trusted users are not incentivized to simply assess all tasks as being correct. This provides the tasking system 110 with improved accuracy in estimates of the overall quality of the deliverable for a given task batch as to estimate the ability of trusted users to properly flag incorrect answers. Trusted users continue to receive review on their own work as well.

In one example embodiment, the operations module 160 may systematically identify user answers for internal or community review, with both qualitative and quantitative feedback being recorded and presented back to the original user. The operations module 160 may systematically identify user answers to be pulled into the review queue for assessment by mentor users. The operations module 160 can pull more answers for review when the user is starting on a new task and then pull fewer answers as the user becomes more experienced and the system has more precise estimates of their overall accuracy on that task. One possible implementation of the systematic sampling function is to define a collection of checkpoints during tasking where review should be applied, for example, the checkpoints may be {5, 10, 15, 20, 25, 30, 35, 40 . . . }. Each time a checkpoint is reached the assessment module 170 will select an answer for review for each checkpoint passed.

In one example embodiment, the operations module 160 may stochastically identify user answers for internal or community review, with both qualitative and quantitative feedback being recorded and presented back to the original user. The operations module 160 may stochastically identify user answers to be pulled into the review queue for assessment by mentor users. The operations module 160 can pull more answers for review when the user is starting on a new task and then pull fewer answers as the user becomes more experienced and the system has more precise estimates of their overall accuracy on that task. One possible implementation of the stochastic sampling function is to define a collection of checkpoints during tasking where review should be applied, for example, the checkpoints may be {5, 10, 15, 20, 50, 100, 500, 1000 . . . }. Rather than deterministically selecting the 5th, 10th, and 15th answer (and so on) from the user the system can add a stochastic component to ensure that users will not be able to "game" the operations module 160 by identifying which tasks must be completed correctly. The stochastic component could be that each time a checkpoint is reached the assessment module 170 will select an answer for review with some probability (e.g., 80% probability) until one answer has been selected for review for each checkpoint passed.

The operations module 160 may be configured to determine the payment amount for tasks. Payment for tasks may be variable, depending on the outcome of the task. For example, a task to find information on the internet may pay a first pre-determined amount, e.g., $0.10, if the information is found, but it may pay a second predetermined amount that is lower, e.g., $0.05, if the information is not found. Users may also qualify for bonuses if they hit certain performance goals. The operations module 160 applies performance-based bonuses, and "surprise" bonuses to maximize quality and avoid users "gaming" the system for bonuses. The operations module 160 may also increase payouts to accelerate task track completion, including ratcheting up payouts through a track's lifecycle. Where payouts may be used, the tasking system 110 advantageously is configured to assign a task in a manner for completion that may involve as few users as possible with a high degree of expected success in having the task completed accurately and timely, thereby saving processing cycles, costs, time, and/or other resources.

In one example embodiment, the operations module 160 may be configured to provide a customer satisfaction phase of the task which allows mentors and customers to iterate on the task process until the customer is satisfied with work produced by the mentor. Thus, the tasking system 110 has an optional initial tasking phase to ensure customer satisfaction. In this phase a small batch of tasks is opened by the tasking system 110 only to mentors. Those users provide answers to the questions and then provide direct feedback on the clarity of the task and instructions and offer suggestions for improvements. The operations module 160, the customer and mentors then iterate on the task process until the customer is satisfied with the work that is being produced by the mentors. At that point the task is ready to be opened by the tasking system 110 to the broader community and the mentors will help train the community to do the task correctly through their assessments and written feedback.

In one example embodiment, the operations module 160 may be configured to create communities of users to allow a group of users create, manage, and communicate within a community. The operations module 160 may be configured to develop the ability for a crowd of users to organically create, manage and communicate within fungible crews (groups of users). Each crew communicates internally to share lessons, and may compete, challenge and be compared to other crews. This sense of belonging, reputation and competition encourages quality tasking.

The operations module 160 may allow for gamification of tasks or sets of tasks. For example, the operations module 160 configured to expose users to a leaderboard that assesses the quality of the insights they are providing relative to other users or groups of users. The ability to transform that corpus of relative user knowledge across domains into high score-boards allows users to see where they stand in term of their work. Moreover, the operations module 160 can be configured to use this information to provide for competition between users (e.g., to raise performance goals to meet business metrics).

A level of users' engagement over time, and the quality of their output, is largely a function not only of payouts, but of the quality of the interface. The operations module 160 may be configured to include a library of customizable mobile and desktop browser tasks that make it fun and easy to complete the tasks. Interfaces are optimized for clear instructions, interstitial hints, minimal clicks/taps, and delightful feedback including graphics, sounds, messages, scoring, badges and experience points.

The operations module 160 is configured to manage a workflow of the task assigned to the user. The operations module 160 may define, monitor, and manipulate the workflow to optimize and manage tradeoffs between velocity, quality, scale and/or cost. The operations module 160 may vary the assignment of the task to different users based on the stage of the task. The operations module 160 may reassign the task to a different user responsive to a change in the qualification level of the user. The operations module 160 may change the quality criteria of a task at each step of the workflow based on a number of qualified users for a task. The operations module 160 may also customize a workflow of the task assigned to the user. An example of a customized workflow of a task is further described with FIGS. 8A and 8B.

Figure 8A:
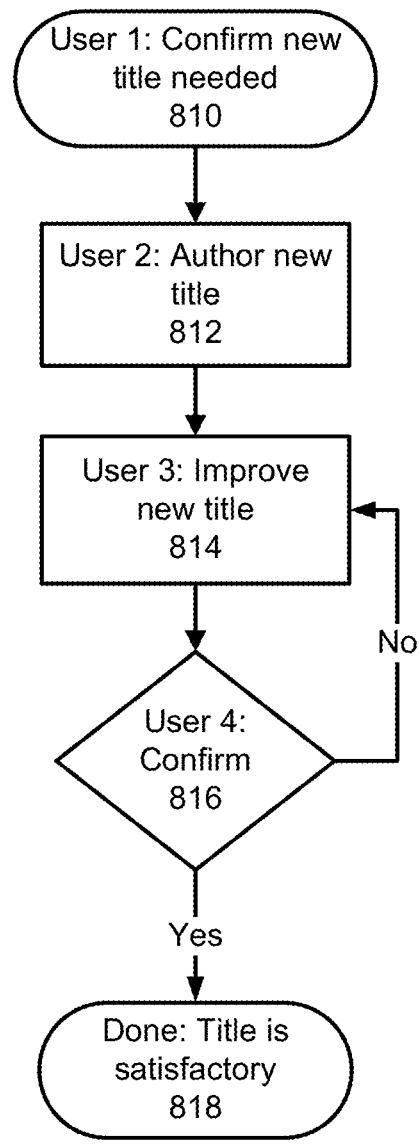
FIG. 8A illustrates an example customized workflow interaction.

FIG. 8A illustrates an example customized workflow interaction. In this example, the task is image metadata tagging and/or captioning. The operations module 160 manages a customized task workflow such that the task is broken down into different stages for completion, and each stage is assigned to a different user. At step 810, user 1 confirms that the image requires a new title based on predefined criteria. User 1 may be a mentor user, or a user with a high quality score, who is able to make such an assessment. At step 812, user 2 generates new content by authoring a new caption for the image. User 2 may be efficient at generating new captions for images. At step 814, user 3 improves the content by editing the image caption generated by user 2. User 3 may be efficient at editing, but not generating content (e.g., some users are excellent editors, but less proficient as authors). At step 816, user 4 may confirm that the content is appropriate and the task is complete, in which case the next step is 818 in which the task is done. User 4 may be higher in quality score than user 1 since user 4 is determining which answers are accepted. At step 816, user 4 may not confirm that the content is appropriate, in which case the operations module may send the task back to step 814 for user 3 to improve the title.

Figure 8B:
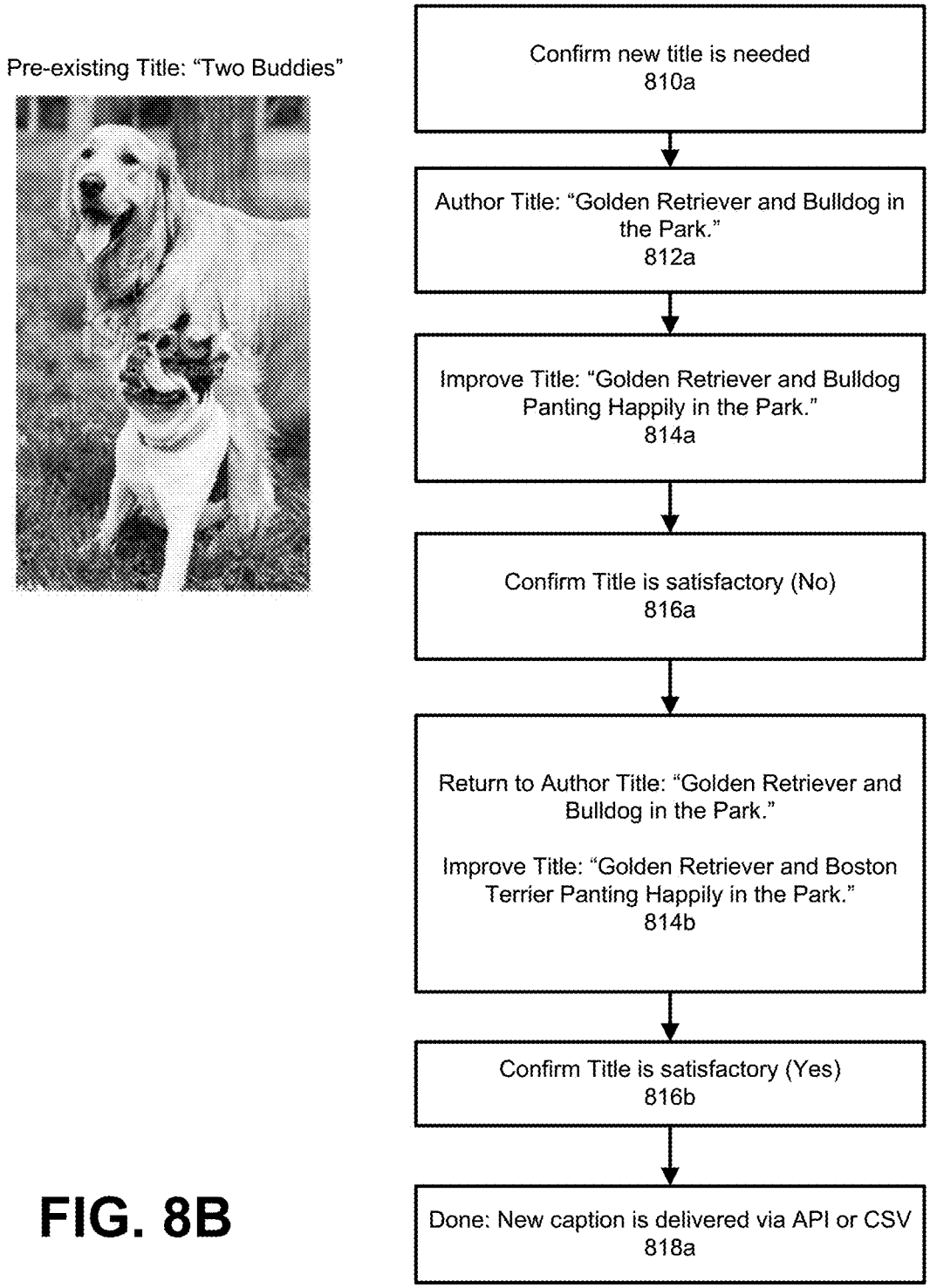
FIG. 8B illustrates an example of a customized workflow.

FIG. 8B illustrates an example of a customized workflow. This customized workflow is a specific example of the customized workflow shown in FIG. 8A. In this example, the pre-existing title to a picture including two dogs is "Two Buddies". In step 810a, user 1 confirms that the image requires a new title because it does not describe the image in detail (e.g., type of dog, location, action). In step 812a, user 2 authors a new title including details such as the type of dogs and the location of the scene in the image, "Golden Retriever and Bulldog in the Park". In step 814a, user 3 edits the new title to include actions being done in the image, "Golden Retriever and Bulldog Panting Happily in the Park". In step 816a, user 4 determines that the new title is not satisfactory because the type of dog being described in the picture is not correct, and the task is returned to user 3 with the original new title, "Golden Retriever and Bulldog in the Park" in step 814b. In step 814b, user 3 improves the title by correctly identifying the dogs in the picture, "Golden Retriever and Boston Terrier Panting Happily in the Park". In step 816b, user 4 confirms that the title is satisfactory. In step 818a, the task is done and the new caption is delivered via an Application Program Interface (API) or comma-separated values (CSV) to the customer.

The operation module 160 may be configured to determine a number of fungible workflows. The operation module 160 may comprise a secure Task Workflow Manager (TWM) that creates the ability to manipulate, launch, monitor and adjust a variety of customized workflow templates to optimize the quality of human micro-task completion. These workflows may include the ability to author and then confirm the quality of content. If the content is determined to be unacceptable, various workflows can reroute the pre-existing or recently authored content for editing or re-authoring; followed by additional confirm or edit loops. The Task Workflow Manager allows platform administrators and customers to define, monitor and manipulate these workflows to optimize the ratio of quality to cost, at scale (algorithmically) and in real-time. The TWM may define, monitor, and manipulate the workflow to optimize and manage tradeoffs between velocity, quality, scale and/or cost. The TWM may be configured to allow the administrator (customer) to vary assignment, pre-qualification, and ongoing quality criteria at each step of the workflow.

Assessment

After a task is completed, the tasking system 110 assesses the quality of completed tasks using different techniques based on task type. The tasking system 110 includes an assessment module 170 configured to assess quality of completed tasks. The assessment module 170 may use different techniques based on the type of task being assessed. The task type may be, for example, training/qualification test (questions with known or consensus answers), quality control (standard/trap questions), or tasks (stochastically flagged questions for internal or community review). The techniques may include, for example, one or more of: user agreement (individual answers weighted by user reputation), holistic scoring (human review tasks as satisfactory/unsatisfactory), calibration questions (consensus answer among a large number of users), standard questions (known answer), trap questions (known incorrect answer), and user behavior (time spent per task, repetitive inputs, and inappropriate answer patterns).

The acceptance range for user agreement is based on individual answers that are weighted by user reputation. For example, an answer from a user of mentor status will have a higher weight than an answer of a user of qualified status. The acceptance range for holistic scoring may be based solely on the feedback of a mentor of the completed task being satisfactory or unsatisfactory. The acceptance range for calibration questions may be based on a consensus among the answers from the large number of users. The acceptance range for standard questions may be based on having an answer agree with a predetermined correct answer. The acceptance range for trap questions is based on having an answer that does not match a predetermined incorrect answer. The acceptance range for user behavior may be based on whether user behavior falls within a range of user behaviors. The user behavior may be time spent per task, relative inputs, and inappropriate answer patterns. The user behavior may be weighted based on user status. Additional information such as location and IP address of the user may be used to monitor for fraud by identifying suspicious patterns or behavior at an extreme of a range of data.

The assessment module 170 may include a predictive modeling system for constructing and updating user quality scores and answer quality scores in real-time at scale. User quality scores for all task sets are updated each time a user completes a task, each time a review of that user's work is submitted, and whenever demographic, e.g., FACEBOOK or LINKEDIN attributes change. Underlying predictive models are also refreshed regularly as additional training data (marked answers) become available.

The assessment module 170 may be configured to use a community (which may be developed over time) to drive a QA process. The assessment module 170 is configured to identify a collection of trusted users (e.g., mentors) who consistently provide high quality answers. The assessment module 170 provides the mentors special access to "Review" tasks which pay a premium (e.g., 50% more than the task normally pays). The review tasks include a structured assessment of the quality of the answer plus optional written feedback to be provided back to the user who answered the original question. The assessments conducted by mentors can be used to form training data which feed into predictive models for user accuracy and answer accuracy. The users also may evaluate mentors' assessments and feedback. If they disagree with the mentors' assessment users may flag and defend their original answers. This defense may be provided back to the mentor who conducted the review, posted to an independent third party mentor for final determination, and/or sent back to the assessment module 170 for manual inspection. This feedback loop allows assessment module 170 to identify problematic patterns such as the mentor being overly harsh in their reviews or providing offensive or counterproductive feedback.

Figure 9:
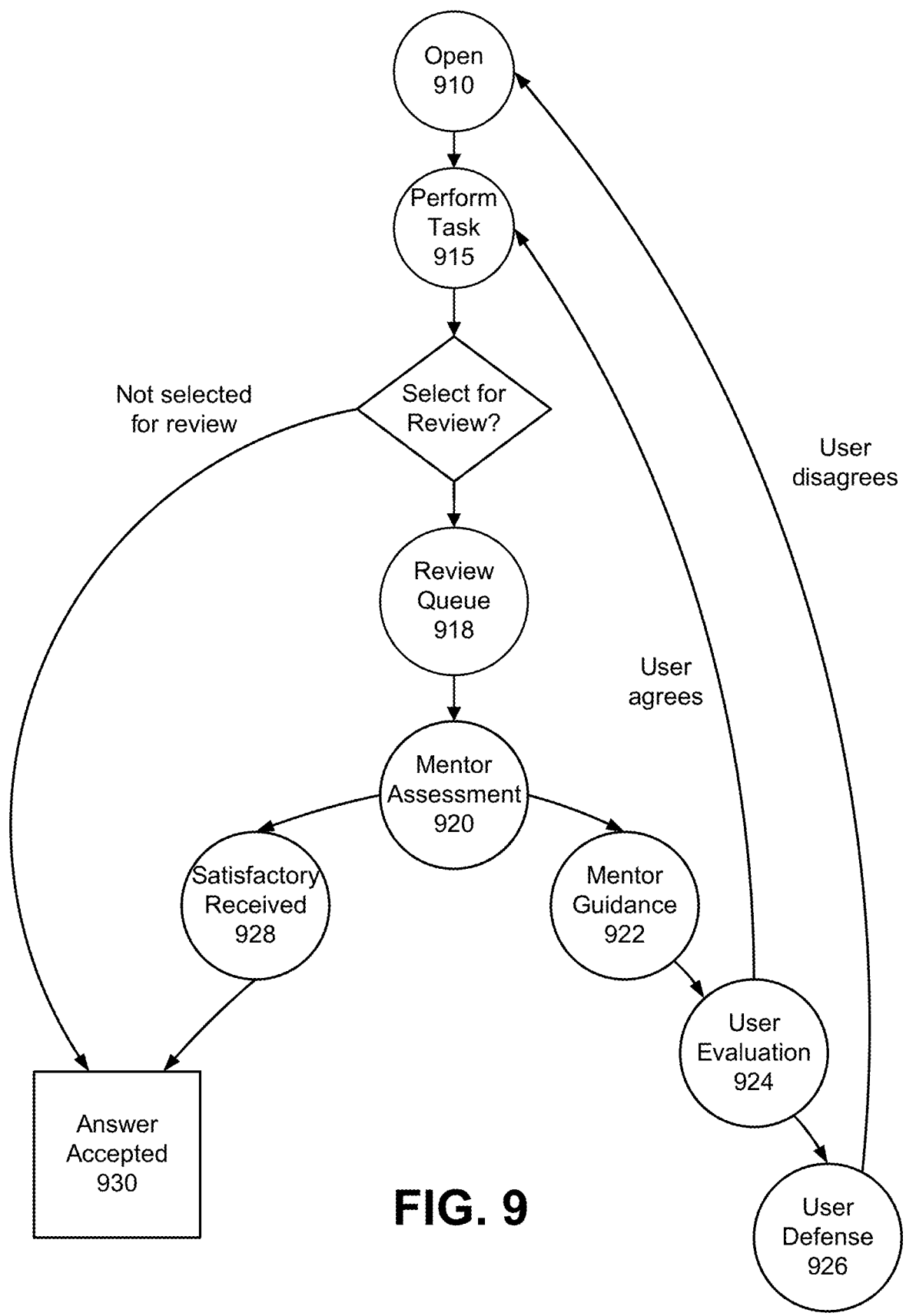
FIG. 9 is a state diagram for an example task assignment.

FIG. 9 is a state diagram for an example task assignment. In this task assignment, Community QA is being used to assess a task. The task begins in the open state 910, in which the targeting module 120 may be targeting users for the task based on targeting criteria, the prediction module 130 may predict which users will likely perform well for the task, and the assignment module 140 may qualify users for the task. Once the task is distributed to a user, or the assignment module 140 allows a user access to the task, the task moves to the perform task state 915 in which the user may perform the task or answer the question. Once the user answers the question, the task may move directly to the answer accepted state 930. Alternatively, the operations module 160 may stochastically select the user answer for community review and use Community QA to assess the task, and the task may move to a review queue state 918. Once a mentor has picked up the review task, the task may move to the mentor assessment state 920. If the mentor user completes the assessment of the answer and determines that the answer is correct, the task may move to the satisfactory received state 928. The positive feedback from the mentor user is provided to the user, and the task may move to the answer accepted state 930. If the mentor user determines that the answer is incorrect, the task may move to a mentor guidance state 922, and the mentor user can optionally provide additional written feedback to the user which may include encouragement and provides further instruction for how the user can improve their accuracy on the task set. The user receives and evaluates the feedback in the user evaluation state 924. If the user agrees with the feedback, the user may continue to perform the task, and the task moves back to the perform tasks state 915. If the user disagrees with the feedback, the user may submit a defense of their answer and the task may move into a user defense state 926. The assessment module 170 may disagree with the user defense and the task may be sent back to the open state 910. The tasking system 110 may assign the task to a new user, and the task may move to the perform task state 915. Alternatively (although not shown), the tasking system 110 may assign the task to the same user if the assessment module 170 determines that the mentor was not correct in the assessment and the task may move to the perform task state 915. The process continues until the task moves to the answer accepted state 930. In some cases a task may move to the answer accepted state 930, but the user may be identified as fraudulent at a later point in time or will have consistently provided answers that are deemed to be of too low quality. In this case some portion (or all) of the user's previous tasks that will be moved back to the open state 910 so they can be completed by new users.

Customer Feedback

The feedback module 180 may be configured to provide data insights to customers and receive customer feedback on the data insight. Data insights are delivered to customers in two ways, via a flat-file data export, or via the API of the tasking system 110. Data export files can be customized by the customer via the web portal to include and pivot on specific attributes, and may include both the raw data as well as weighted best answers and confidence scores. Data export files can also be exported in file formats that are ready to import into external systems, such as those used for training data. The system API can either be queried (polled) for insights, or a callback URL can be registered with the system, and insights are then pushed to the customer as they are ready. Ready may be defined by not just the specific task being completed, but by the task completing its entire workflow including review tasks and potentially re-running the task with additional users until a certain confidence score is achieved. The customer has a mechanism to provide the system with feedback on whether they agree with the insight. This data is fed back into the tasking system 110 to influence user reputation as well as set additional calibration points for future tasks.

Continuous Learning

The tasking system 110 improves data quality, task workflow pace, and cost by continuously learning from customer feedback and other data collected by the tasking system 110. The tasking system 110 includes models trained on marked answer data to score quality of answer accuracy, user assignment accuracy, user tasking accuracy, task batch accuracy.

The tasking system 110 may include prediction models that are trained on marked answer data. Marked answer data is typically collected from the current task set and/or similar task sets. Marked answers are deemed correct, incorrect or ambiguous through a variety of means depending on the structure of the task, question and answer. Example methods for collecting marked data include: comparing answers to known correct standard answers, comparing to known incorrect trap answers (e.g., evaluating review tasks), Community QA where trusted users (e.g., mentors) evaluate other user answers, internal manual assessment of answers, automated analysis of answer features, consensus analysis (e.g., expectation maximization algorithm) whenever multiple users have answered the same question, and heuristics and telemetry data to identify problems such as users moving too fast through tasks. Community QA may be particularly helpful for building out training data.

The tasking system 110 may include a model for determining answer quality that is specific to each task batch or a specific family of batches. Input features in the model can include user features such as demographics, skills, interests and past performance on this task and other related tasks as well as answer-level features such as the time to complete the task or the number of words in the answer. The answer accuracy model can be trained on the existing marked data which indicates whether each answer in the training data set of answers was correct or incorrect. An automated model construction process (described in more detail below) can then be used to select a model which is able to predict answer accuracy with highest predictive power on a hold-out test set after multiple iterations for cross-validation. The final model can be used to score the accuracy of any answer in that task set or family of tasks by providing the appropriate inputs in to the model and receiving the prediction (or score) as output.

The tasking system 110 may include a model for user quality that may estimate how likely that user is to perform the task at the desired level of quality. These models can be specific to each task batch or to a specific family of batches that may be based on domain knowledge, type of task (e.g., writing, image bounding boxes), or other shared features. Input features in the model can include all available user features such as demographics, skills, interests and past performance on other tasks (e.g., proportion of answers deemed correct via Community QA review for all image captioning tasks) as well as answer-level features for other tasks aggregated at the user level (e.g., the average time per word to complete image captioning tasks or the average number of words in each answer). The model can be trained on the existing marked data which indicates whether each answer in the training data set of answers was correct or incorrect. Depending on the amount of data available, the model can be constructed such that each row of data represents one answer provided by a user, or it can be constructed such that only one row per user is selected and that row represents the most recent answer submitted by that user. An automated model construction process (described in more detail below) can then be used to select a model which is able to predict overall user accuracy (reputation) with highest predictive power on a hold-out test set after multiple iterations for cross-validation. The final model can be used to score the accuracy of any user prior to allowing them to answer any questions in that task set or family of tasks by providing the appropriate inputs in to the model and receiving the prediction (or score) as output.

The tasking system 110 may include a model for user quality that is specific to each task batch or a specific family of batches. Input features in the model can include all available user features such as demographics, skills, interests and past performance on this task (e.g., proportion of answers deemed correct via Community QA reviews) and other related tasks such as answer-level features aggregated at the user level (e.g., average time to complete the task or the average number of words in each answer). The user accuracy model can be trained on the existing marked data which indicates whether each answer in the training data set of answers was correct or incorrect. The model can be constructed such that each row of data represents one answer provided by a user, or it can be constructed such that only one row per user is selected and that row represents the most recent answer submitted by that user. An automated model construction process (described in more detail below) can then be used to select a model which is able to predict overall user accuracy with highest predictive power on a hold-out test set after multiple iterations for cross-validation. The final model can be used to score the accuracy of any user who has completed work on that task set or family of tasks by providing the appropriate inputs in to the model and receiving the prediction (or score) as output.

The tasking system 110 may estimate the accuracy of the existing collection of completed tasks with accepted answers. This estimate represents the proportion of answers in the collection of completed tasks that meet the customer's predefined criteria which indicate whether an answer can be marked correct or incorrect. Task batch accuracy is a key metric for customers as it represents the overall quality of the deliverable. One method to estimate task batch accuracy is to compute the answer accuracy score for every answer in the existing task batch and then take the mean of those scores to obtain a single estimate for the accuracy of the complete task batch. A confidence interval can also be constructed for that mean can be constructed in the usual way (e.g., Wilson score interval for a proportion).

In one example embodiment, the tasking system 110 can estimate the overall task batch accuracy by incorporating the individual mentor's abilities to accurately identify both correct and incorrect answers in the Community QA setting. For example, the standard and trap review questions indicate that mentors are able to correctly mark a good answer as correct 90% of the time and are able to correctly mark a wrong answer as incorrect about 70% of the time. If the overall task batch had 85% of questions marked as correct and 15% of questions marked as incorrect then a conditional probability may be: P(Marked Correct)=P(Correct)*P(Marked Correct|Correct)+P(Incorrect)*P(Marked Correct|Incorrect). Substituting P(Incorrect)=1−P(Correct) and solving for P(Correct) in the equation above says that the overall task batch accuracy is estimated to be about 91.7%.

The tasking system 110 may include an automated model construction process to select a model with highest predictive power based on a hold-out test set after multiple iterations for cross-validation. Predictive models may be based on random forest models with simple regression models (e.g., AdaBoost). The tasking system 110 can be configured using an open source R package for random forest construction. In one embodiment, the software can be configured to automatically determine which input features are most predictive (from a collection of hundreds or thousands of possible features). The tasking system 110 automatically determines a best fit random forest model through iterative cross-validation on hold-out test sets. The tasking system 110 automatically generates various model fit statistics and visualizations for inspection. This automated modeling process allows for a systematic refresh of each of the predictive models as new training data becomes available without the need for human intervention (with appropriate monitoring to detect when issues arise).

In one embodiment, the tasking system 110 may include a production system for scoring models. The production system may seamlessly move new models directly to production. Models can be written in R and then stored model objects can be pushed to a cloud-based production system where users and answers can be scored. For example, after a user has completed a task, a message can be placed on a queue for asynchronous processing by a pool of worker nodes in a distributed system. The worker node can pick up the message and run a battery of heuristics to identify problematic patterns in the user's behavior. The worker node can calculate all predictive model scores that are relevant to the user and take any necessary actions as a result of those scores. For example, necessary actions could be pausing the user from completing more work until further review/assessment is completed, permanently stopping the user from completing more work on this task, elevating the user to mentor status, opening a new task batch (or batches) to the worker based on good quality work (which had the effect of increasing their predictive model score for quality on the new batch above some threshold), closing this and other related tasks to the user based on poor performance which happened to decrease the predictive model score for quality on other task batches below some threshold. Worker nodes process messages in parallel and the number of workers can be scaled dynamically to account for changes in load.

The tasking system 110 may be configured to automatically equip the predictive models with the ability to form accurate predictions in two specific situations: missing values in the input data fields and the appearance of novel (previously unseen) values in categorical input fields. Missing values could be any attribute that is missing in data of the tasking system 110. Examples of missing values could be one of the following: the tasking system 110 is not able to collect FACEBOOK data for the user; the user did not report gender; or the tasking system 110 could not get reliable location data for the user. An example of an appearance of novel values could be if Facebook added a new category for "gender" that the tasking system 110 has not previously encountered. Thus, all models were trained using only the prior existing categories, but the models will still be able to form accurate predictions for the new user who has a novel value for gender. Most machine learning packages require that the user impute (infer) any missing values before applying the model which can lead to reduced model accuracy. In contrast, the decision tree models within the random forest model package may include alternate splits for any missing values which provide a boost in model accuracy. In one example embodiment, the tasking system 110 may be configured to handle novel categorical values by making appropriate decisions for replacement of those categorical values. The decision to replace the categorical value may be to replace it with a missing value, replace it with the highest frequency value in the training data, or replace it with the value that provides minimum impact on the resulting prediction.

The tasking system 110 uses predictive modeling to continually update knowledge of users and their abilities which allows for optimization for cost, pace and efficiency. In one embodiment, the tasking system 110 collects a variety of features from each completed task of a user such as the time a user takes to complete each task as well as the number of words contained in a user's answer for a writing task. The tasking system 110 also may optionally measure consensus among a variable number of users' inputs, weighting each user's answers differently based upon their reputational scores. The reputational scores may be based on overall, specific domain (e.g., golf, interior design), a task type (e.g., authoring, rating), and for the specific task track in question.

Each time a user completes a task, the tasking system 110 may update an estimate of how well that user is doing on that task by incorporating all available user features and past performance data into the predictive model and rescoring that user. Available input data includes user demographics, user skill and interest details, task-level features (e.g., average time to complete the task) as well as all review/assessment data collected internally or received from mentors regarding this user through the Community QA process. Higher weights may be applied to the user's more recent work as applicable. The tasking system 110 uses the updated scores to decide whether to allow the user to continue working on the task or block them from completing future work and optionally ignore some or all of their previous answers. The decision can be made in, for example, two ways. First, by way of example, a quality heuristic may block any user with estimated accuracy below a desired threshold. For example, the tasking system may block any user below a predefined threshold, e.g., 90%. Second, by way of example, a batch-level quality heuristic may remove lowest performing users whenever the estimate of overall batch accuracy falls below a desired threshold. For example, if the estimated accuracy on the entire task batch over all users falls below 90% the tasking system 110 may block the lowest scoring users and optionally ignore some or all of their previous answers until the estimated accuracy on the batch meets and/or exceeds the predefined, e.g., 90% threshold again.

Example Machine Architecture

Figure 10:
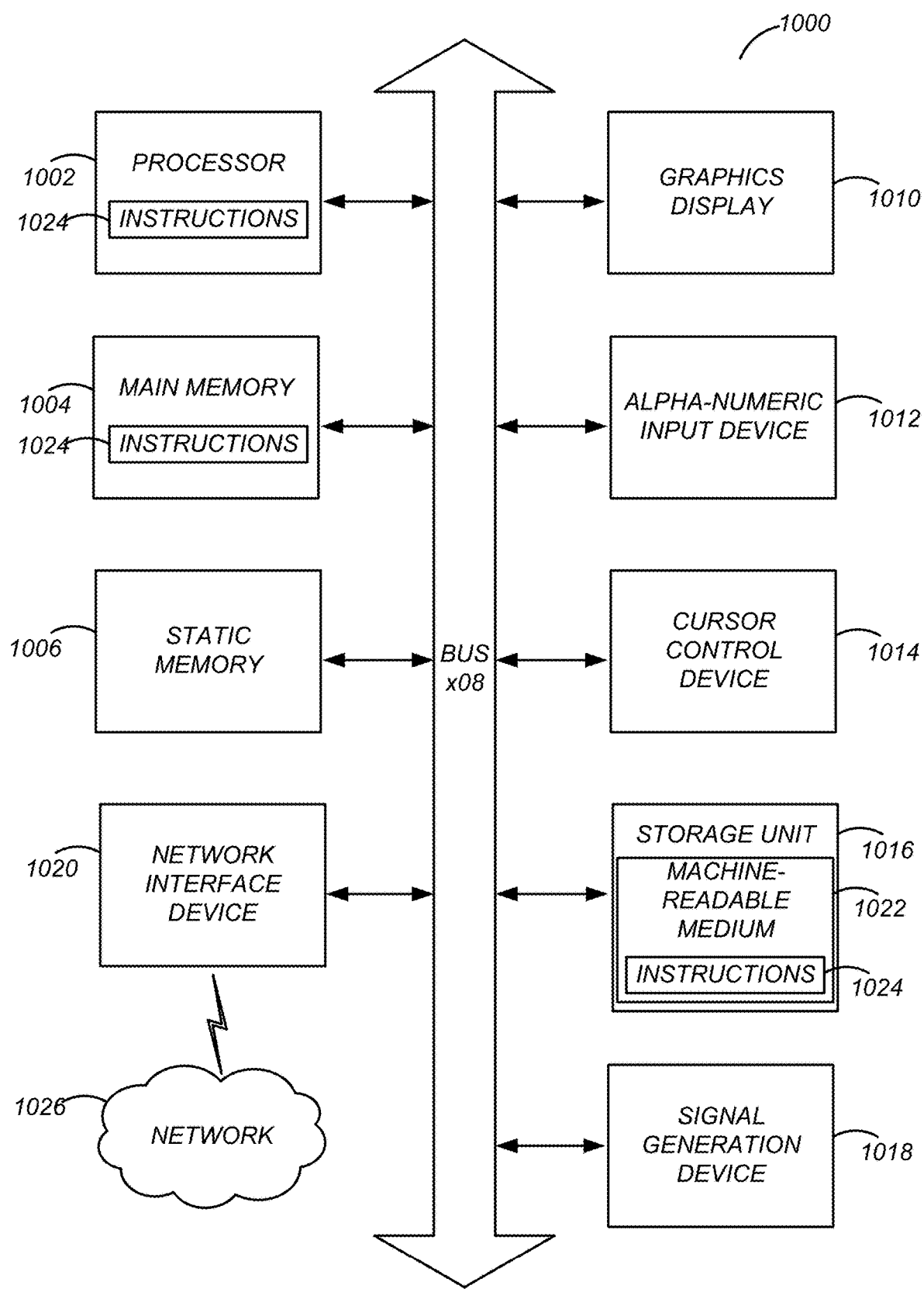
FIG. 10 is a block diagram illustrating components of an example machine able to read instructions from a machine-readable medium and execute them in a processor (or controller).

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1000 also includes a main memory 1004. The computer system may include a storage unit 1016. The processor 1002, memory 1004 and the storage unit 1016 communicate via a bus 1008.

In addition, the computer system 1006 can include a static memory 1006, a display driver 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The tasking system as disclosed provides benefits and advantages that include assigning a user to a task by targeting a user such that the user has a high chance of success in completing the task successfully. The tasking system solves the problems of issues involving large data sets in computer systems (e.g., large data sets being unstructured, disorganized, and therefore lacking meaning). The tasking system allows the addition of structure or organization to the data sets so that they may be useful in further processing and application. The tasking system assigns, analyzes, and confirms completion of tasks related to the structure or organization of the large data sets in computer systems. The tasking system may generate ground truth data used for training machine learning and artificial intelligence systems. The tasking system can optimize for the number of users to complete a task quickly, efficiently, and correctly, thereby saving resources while maintaining high accuracy. The tasking system may have users with similar profiles to a business' target users to provide insights before exposing data to the target users. There are a variety of variables that impact velocity, cost, efficiency and quality, and the system optimizes for these goals based on customers' requirements. The system can boost any of these goals by, for example, adjusting qualification standards, payouts, users per task, mentor review frequency, task limits, speed brakes (see, e.g., speed manager module 540 above), targeting criteria, and/or acquisition of new users.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 3, and 5. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1002, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a tasking system and a process for assigning computerized tasks to users through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for determining computerized tasks for assignment, the method comprising:
   targeting a user to perform a task based on targeting criteria and stored information from a user profile;
   predicting, based on one or more machine-learned models, success of the user to perform the task based on a past performance of the user on a similar task, wherein the one or more machine-learned models are trained based on marked data;
   assigning the task to the user if the predicted success is greater than a threshold level;
   managing a workflow for the task assigned to the user;
   assessing if the task as completed by the user is within a predefined acceptance range;
   receiving customer feedback on the task when completed by the user;
   updating the one or more machine-learned models based on the task completed by the user;
   identifying common characteristics of a set of users based on previous performance of the users on a set of tasks being equal to or above an acquisition threshold value, wherein the set of users comprises the user;
   acquiring additional users with the common characteristics; and
   adjusting the common characteristics and the acquisition threshold value based on an assessment of additional tasks as completed by one or more of the additional users.

2. The method of claim 1, further comprising:
   receiving a login from the user through an external system; and
   storing external user information in the user profile of the user based on information from the external system.

3. The method of claim 1, wherein the stored information in the user profile further comprises information on a reputation of the user based on previous performance and activities of the user.

4. The method of claim 1, wherein the stored information in the user profile further comprises information on a reputation of the user based on previous performance and activities of the user for a given domain.

5. The method of claim 1, wherein the stored information in the user profile further comprises information on a reputation of the user based on previous performance and activities of the user for a given task type.

6. The method of claim 1, wherein predicting the success of the user is further based on at least one of the following: patterns in previous tasking behavior of the user, user data from outside sources, or user surveys.

7. The method of claim 1, wherein assigning the task further comprises:
   training the user for a task set, qualifying the user to perform the task set, and giving the user access to the task after the user successfully completes the training and the qualifying steps for the task set.

8. The method of claim 7, wherein assigning the task further comprises:
   adjusting a threshold level for assigning the task to the user based on a total number of qualified users identified through the training and the qualifying steps.

9. The method of claim 1, wherein assigning the task further comprises: setting a maximum number of tasks an individual can complete.

10. The method of claim 1, wherein managing the workflow for the task assigned to the user further comprises varying at least one of an assignment, a qualification, or ongoing quality criteria at each step of the workflow.

11. The method of claim 1, wherein managing the workflow for the task assigned to the user further comprises manipulating the workflow to determine a tradeoff among velocity, quality, and cost.

12. The method of claim 1, wherein the predefined acceptance range is based on at least one of: user answers, user answers weighted by user reputation, a known answer, or assessment of the completed task by a mentor, the mentor being a user with elevated status.

13. The method of claim 12, wherein the mentor has received positive feedback on completed tasks greater than a positive feedback threshold.

14. A non-transitory computer-readable storage medium comprising stored executable computer program instructions for assigning tasks, the computer program instructions when executed by a computer processor cause the computer processor to:
   target a user to perform a task based on targeting criteria and stored information from a user profile;
   predict, based on one or more machine-learned models, success of the user to perform the task based on a past performance of the user on a similar task, wherein the one or more machine-learned models are trained based on marked data;
   assign the task to the user if the predicted success is greater than a threshold level;
   manage a workflow for the task assigned to the user;
   assess if the task as completed by the user is within a predefined acceptance range;
   receive customer feedback on the task when completed by the user;
   update the one or more machine-learned models based on the task completed by the user;
   identify common characteristics of a set of users based on previous performance of the users on a set of tasks being equal to or above an acquisition threshold value, wherein the set of users comprises the user;
   acquire additional users with the common characteristics; and
   adjust the common characteristics and the acquisition threshold value based on an assessment of additional tasks as completed by one or more of the additional users.

15. The computer readable medium of claim 14, further comprising instructions that cause the processor to:
   receive a login from the user through an external system; and
   store external information in the user profile of the user based on information from the external system.

16. The computer readable medium of claim 14, wherein the stored information in the user profile further comprises information on a reputation of the user based on previous performance and activities of the user.

17. The computer readable medium of claim 14, wherein the prediction of success of the user to perform the task is further based on at least one of the following: patterns in previous tasking behavior of the user, user data from outside sources, or user surveys.

18. The computer readable medium of claim 14, wherein the instruction to assign the task further comprises instructions that cause the processor to:
train the user for a task set, qualify the user to perform the task set, and give the user access to the task after the user successfully completes the training and the qualifying steps for the task set.

19. The computer readable medium of claim 18, wherein the instruction to assign the task further comprises instructions that cause the processor to:
adjust the threshold level for assigning the task to the user based on a total number of qualified users identified through the training and the qualifying steps.

20. The computer readable medium of claim 14, wherein the instruction to assign the task further comprises instructions that cause the processor to:
set a maximum number of tasks an individual can complete.

21. The computer readable medium of claim 14, wherein the instruction to manage the workflow of the task assigned to the user further comprises instructions to vary at least one of an assignment, qualification, or ongoing quality criteria at each step of the workflow.

22. The computer readable medium of claim 14, wherein the predefined acceptance range is based on at least one of: user answers, user answers weighted by user reputation, a known answer, or assessment of the completed task by a mentor, the mentor being a user with elevated status.

23. The computer readable medium of claim 22, wherein the mentor has received positive feedback on completed tasks greater than a positive feedback threshold.

24. A non-transitory computer-readable storage medium comprising stored executable computer program instructions for assigning tasks, the computer program instructions when executed by a computer processor cause the computer processor to:
target a user to perform a task based on targeting criteria and stored information from a user profile;
predict, based on one or more machine-learned models, success of the user to perform the task based on a past performance of the user on a similar task, wherein the one or more machine-learned models are trained based on marked data;
assign the task to the user if the predicted success is greater than a threshold level;
manage a workflow for the task assigned to the user;
receive customer feedback on the task when completed by the user;
update the one or more machine-learned prediction models based on the task completed by the user;
identify common characteristics of a set of users based on previous performance of the users on a set of tasks being equal to or above an acquisition threshold value, wherein the set of users comprises the user;
acquire additional users with the common characteristics; and
adjust the common characteristics and the acquisition threshold value based on an assessment of additional tasks as completed by one or more of the additional users.

* * * * *